United States Patent [19]

Li

[11] 4,117,909
[45] Oct. 3, 1978

[54] WHEEL TORQUE FEEDBACK CONTROLLED FRONT BRAKE

[75] Inventor: Yao T. Li, Lincoln, Mass.

[73] Assignee: Massachusetts Institute of Technology, Cambridge, Mass.

[21] Appl. No.: 761,752

[22] Filed: Jan. 24, 1977

Related U.S. Application Data

[63] Continuation of Ser. No. 697,888, Jun. 21, 1976, abandoned, which is a continuation of Ser. No. 552,815, Feb. 25, 1975, abandoned.

[51] Int. Cl.$^2$ .......................... B60T 8/00; F16D 55/08
[52] U.S. Cl. ..................................... 188/2 A; 188/26; 188/72.7; 188/181 T
[58] Field of Search .................. 188/2 A, 2 D, 26, 27, 188/72.1, 72.3, 72.7, 72.9, 216, 181 T

[56] References Cited

U.S. PATENT DOCUMENTS

| | | | |
|---|---|---|---|
| 2,081,444 | 5/1937 | Aikman | 188/181 T |
| 3,655,016 | 4/1972 | Watanabe | 188/2 A |
| 3,675,741 | 7/1972 | Frei et al. | 188/26 |
| 3,878,921 | 4/1975 | Kibler et al. | 188/72.7 |

FOREIGN PATENT DOCUMENTS 616,316  3/1961  Canada ................. 188/181 T

*Primary Examiner*—Edward R. Kazenske
*Attorney, Agent, or Firm*—Arthur A. Smith, Jr.; Martin M. Santa

[57] ABSTRACT

A torque controlled brake of the disc type has a caliper which is free to rotate about the axis of the wheel shaft. The caliper contains a rotatably mounted lever having disc pads which press upon the disc to provide the frictional braking force. The pads close onto the disc in response to rotational motion of the lever with respect to the caliper. This rotational motion is produced by a manually controlled brake lever on the handlebar of a bicycle. The rotational motion is restrained by a cable attached to the bicycle frame and to the lever, thus providing a negative feedback effect. The braking torque is dominated by the restraining force which bears a fixed ratio to the force applied by the manual brake lever. A limited manual braking force thereby determines the maximum braking torque.

2 Claims, 5 Drawing Figures

WHEEL TORQUE FEEDBACK CONTROLLED FRONT BRAKE

This is a continuation of application Ser. No. 697,888 filed June 21, 1976, which is a continuation of application Ser. No. 552,815 filed Feb. 25, 1975, both now abandoned.

This invention relates in general to wheel braking devices. More particularly, the invention is a brake whose braking torque is controlled by the feedback of the reaction torque produced in braking to the manually applied braking force and whose maximum braking torque is adjustable.

BACKGROUND OF THE INVENTION

The maximum braking deceleration which may be obtained by braking of the front wheel on a bicycle and in lightweight motorcycles is limited by the "nose-over" of the vehicle and rider when the moment of the force of deceleration of the rider's body mass with respect to the ground contact point of the front wheel exceeds the stabilizing moment of the weight of the rider's body also with respect to the same point. For the usual bicycle design the allowable deceleration force is approximately one-half the earth's gravitational force before nose-over occurs, and this is substantially independent of the weight of the rider. Therefore, it is an objective of this invention to provide a brake capable of producing automatically no more than the maximum allowable deceleration force, substantially independent of the condition of the ground surface or the coefficient of friction of the braking system.

It is a further object of this invention to provide a bicycle brake which is torque controlled so that the maximum torque applied to the wheel is fixed and substantially independent of the maximum travel applied to the hand brake above the value which results in the fixed torque value.

It is a feature of this invention that a torque less than the maximum torque may be obtained by controlling the force applied to the handbrake.

It is a further object of this invention to provide such a brake which is lightweight and inexpensive and hence suitable for use on a bicycle.

SUMMARY OF THE INVENTION

These and other objects and features of the invention are obtained by a disc type brake illustrating a particular form of a rotational engaging braking system where the braking pressure of the pads against the disc is applied by a moment applied to the rotary braking system by a manually controlled force which is counteracted by a feedback force. The feedback force is in direct proportion to the reaction force on the frame of the vehicle produced by the braking torque.

More specifically for the disc type brake, a caliper which is free to rotate about the wheel shaft contains a rotatably mounted lever. The lever has disc pads which press upon the disc to provide braking when the lever is rotated about its axis of rotation. The end of the lever which provides the rotation is connected to the manually controlled brake lever on the handlebar of a bicycle. The other end of the lever is connected to the frame of the bicycle to provide reaction force to the braking action. The reaction force is in a direction to rotate the lever in the opposite direction to that produced by the manual control force and thus provides negative feedback.

THE DRAWINGS

The invention, both as to its arrangement and mode of operation, can be better understood from the following description in conjunction with the accompanying drawings in which FIG. 1 is a view of the brake of this invention on the front wheel of a bicycle.

THE INVENTION

Figure 1:
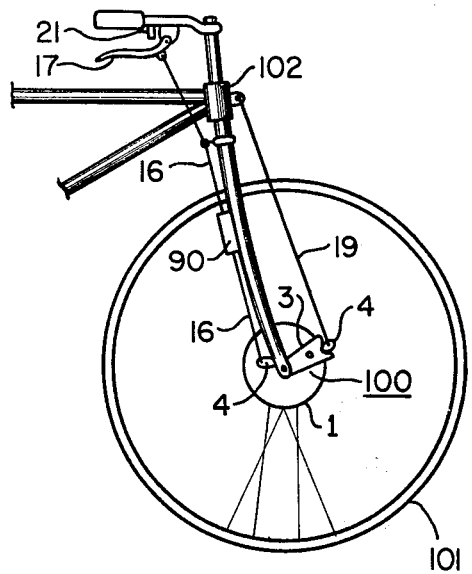

The brake assembly 100 of this invention is shown assembled to the front wheel 101 of a bicycle in FIG. 1. The embodiment of the invention is in the form of an improved disc type brake with the disc 1 shown in the figure. The brake is actuated by pulling on cable 16 with brake lever 17. Spring assembly 90 limits the amount of tension and hence braking force which is applied to brake assembly 100. The cable 19 provides the means by which the braking torque is resisted by the frame 102 of the bicycle.

Figure 2:
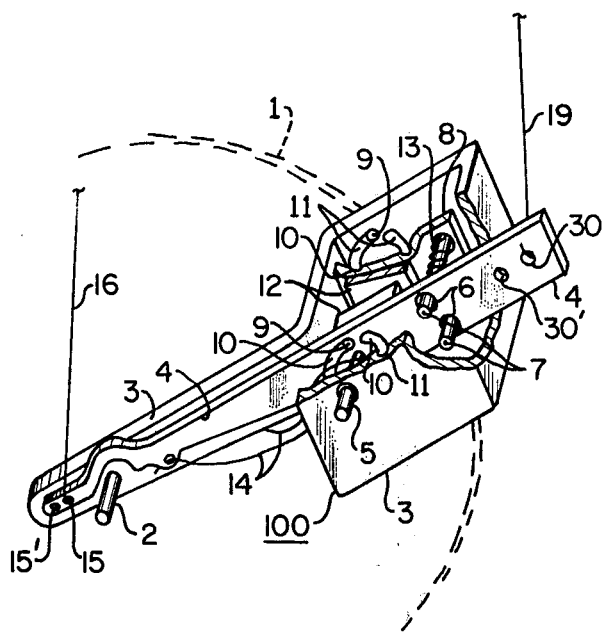
FIG. 2 is a detailed perspective view of the brake assembly of the invention.

A perspective view of a disc type rotational engaging braking system 100 is shown in FIG. 2. The disc 1 is rigidly mounted to the hub of the wheel (not shown) in the conventional manner for disc brakes. The brake caliper 3 is rotatably mounted on shaft 2 so that in the operation of the brake a limited degree of rotation is obtained. The brake lever arm 4 is located partially within the caliper 3 and is rotatably mounted on the caliper by shaft 5. The lever arm 4 has guide holes 6 through which the guide pins 7 are free to slide in a direction transverse to the lever arm. The guide pins 7 are fixedly attached to a lever plate 8. Thus, lever plate 8 is constrained by pins 7 so that its only motion is transverse to lever arm 4.

Figure 3:
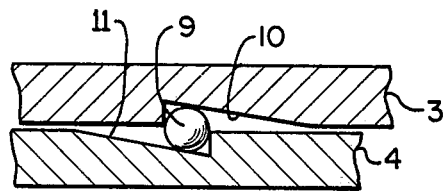
FIGS. 3 and 4 show a cross-sectional view of the races and their included ball when the brake is not engaged and engaged, respectively.
Figure 4:
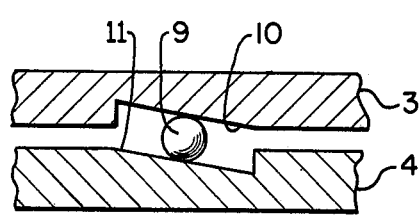
Figure 5:
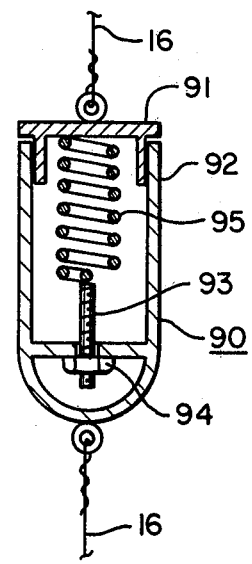
FIG. 5 shows a cross-sectional view of the tension spring assembly.

The inside surface of caliper 3 each contain three tapered ball races 11 (two are shown in FIG. 2). The races 11 lie on a circle concentric with the axis of shaft 5 and the length of each race is less than one-third the circle circumference. Similarly, there are three tapered races 10 on the outer surfaces of lever arm 4 and lever plate 8. When the brake is not actuated, the deepest portion of each race 11 is opposite a corresponding deepest portion of each race 10. A ball 9 is placed in each pair of opposed races. When the brake is not being applied, each ball rests in the deepest portion of both tapered races 10, 11. Rotation of the lever arm 4 about the axis of shaft 5 in a clockwise direction moves balls 9 along races 10, 11 toward the shallower ends of both races thereby moving the pads 12 toward disc 1. An expanded cross-sectional view of races 10, 11 and ball 9 for the disengaged condition is shown in FIG. 3 and in FIG. 4 for the brake engaged condition. It should be noted that race 10 and race 11 have opposite taper directions so that ball 9 is moving from the deepest portion toward the shallowest portion of each race 10, 11 when they are moved with respect to each other.

The brake is engaged by applying an upward force to lever arm tip 15 by a cable 16 attached to a hand brake lever 17 commonly found on bicycles and motorcycles.

The application of force to lever tip 15 causes the rotation of lever arm 4 about shaft 5 and hence the application of a braking force to disc 1 by pads 12. Since caliper 3 is hinged to shaft 2, it offers no reaction torque by itself. As a result, the reaction torque must be provided by cable 19 attached to the other end of lever 4 at point 30. Cable 19 transmits the reaction torque to a convenient point on frame 102 such as on the front fork and is therefore called a torque reacting member.

The spring 13 applies sufficient force to prevent the pads 12 from touching the disc 1 when braking force is not applied to cable 16. Bent-wire spring 14 returns the caliper 3 and lever arm 4 to their initial unrotated positions when the brake is not applied.

The cable 16 has a tension limiting spring assembly 90 inserted along its length whose purpose is to limit the amount of force which can be applied to the brake assembly 100 by the hand braking lever 17. The spring assembly 90 comprises a spring 95 attached to end cap 91 of casing 92. The other end of the spring 95 is attached to a tensioning screw 93 which passes through the other end of casing 92. A nut 94 on screw 93 tensions the spring 95 to the desired tension. The spring assembly 90 is attached at its ends to the cable 16 which connects the handle brake lever 17 to the lever arm 4.

The tensioning of spring 95 determines the maximum force that is applied to tip 15 of lever arm 4 before the spring begins to be further extended. The extension of the spring is limited by the stop 21 which prevents brake lever 17 from moving much beyond the point at which the spring begins to further extend. Thus the maximum force which may be applied to the lever arm 4 is essentially determined by the tension produced on the spring by the nut 94. Since the torque applied to the bicycle which is controlled by the force applied by brake lever 17, it is seen that the maximum braking torque and hence deceleration is controllable. Thus the spring tension would be small for a person of light weight, whereas it would be proportionately higher for a person of heavier weight.

The spring 95 of assembly 90 is preferably a weak spring with a large extension to produce the desired pre-tension since then only a small increase of force accompanies further extension, it may be impractical to adjust the pre-tension to the desired values for persons of substantially different weights. If it is assumed that the spring 95 pre-tension is that required for a child and that cables 16 and 19 are attached to lever arm 4 at points 15 and 30, respectively, a heavier person may get greater braking torque with the same pre-tensioned spring 95 by moving cable 16 to point 15' or cable 19 to point 30', or by moving both cables. A plurality of points 15' and 30' may be available to allow the rider to select the combination which will produce a maximum braking torque which is as near to "nose-over" as he wishes.

The selection of points 15' and 30' at distances $L_1$, $L_2$ from the axis shaft 5 controls the moments of the forces $F_1$ and $F_2$ produced by cables 16 and 19, respectively. An analysis of the equilibrium conditions $F_3 = F_1 + F_2$, where $F_3$ is the brake force at the disc pads 12; and $K(F_1 L_1 - F_2 L_2) = F_3$, where $K$ represents a gain factor of the braking force $F_3$ due to control moment which is a function of the coefficient of friction of the disc pads, the slope of the tapered races 10, 11 and the distances $L_1$, $L_2$; and $F_3 L_1 = T$, where $T$ is the braking torque;

results in the following relationship $$T = \frac{F_1(1 + L_1/L_2) L_1}{1 + 1/KL_2}$$

This equation shows that there is a direct relationship between the braking torque $T$ and the brake control force $F_1$. It further indicates that for $KL_2$ considerably larger than unity, the relationship between braking torque $T$ and control force $F$, can tolerate some variation in the value of $K$. This insensitivity to variations in the value of $K$ is an operating feature resulting from the use of negative feedback provided by the unique design of the invention.

Having described several embodiments of the invention, it is believed obvious that other modifications and variations of the invention are possible in the light of the above teachings. It is therefore to be understood that changes may be made in the particular embodiment of the invention described which are within the full intended scope of the invention as described by the appended claims. For example, the braking member in the preferred embodiment is a disc, however, it is apparent that the rim of the wheel is a radially extended disc and may serve as a braking member with the appropriately scaled braking system 100.

What is claimed is:

1. A braking-torque controlled brake apparatus for a vehicle having a frame and a wheel to be braked, said wheel having an axle, said brake apparatus comprising:
    a first lever pivotally attached at one of its ends to the axle of said wheel,
    a second lever pivotally attached between its ends to the other end of said first lever,
    a brake disc attached to said wheel,
    a brake pad attached to one of the levers and responsive to one direction of relative rotation between said first and second levers to apply a braking force to said wheel by causing said pad to press against said disc,
    a pretensioned spring, a first cable,
    a brake lever attached to one end of said second lever through the pretensioned spring and the first cable to provide said one direction of relative lever rotation in response to activation of said brake lever and to thereby apply a braking force to said wheel,
    a second cable attached between said frame and to the other end of said second lever to provide a reaction force to said second lever to prevent the rotation of said second lever about the axle when a braking force is applied,
    said brake pad being closer to the point of attachment of the second cable point on said second lever than to the point of attachment of said first cable on said second lever to cause said reaction force to be greater than said braking force,
    said pretensioned spring limiting the maximum braking force in relation to the force required to elongate said pretensioned spring.

2. The brake of claim 1 wherein said first and second levers comprise in addition:
    a first tapered race in said first lever,
    a second tapered race in said second lever opposite said first race,
    a ball in said races, said disc pad attached to said one of said levers is on the opposite side of said lever from said race, said first and second pivotally attached levers moving away from each other by the movement of the ball in the races produced by the relative rotation of the levers about their pivot produced by said brake lever actuation, said movement of the levers away from each other causing the pad to produce a braking force against the disc of said wheel.

* * * * *